Patented Nov. 8, 1932

1,886,636

UNITED STATES PATENT OFFICE

GIUSEPPE BRUNI AND TULLIO GUIDO LEVI, OF MILAN, ITALY, ASSIGNORS TO SOCIETA ITALIANA PIRELLI, OF MILAN, ITALY

VULCANIZATION OF RUBBER

No Drawing. Application filed February 17, 1931, Serial No. 516,496, and in Italy February 28, 1930.

It is well known to use the dithiocarbamates of secondary bases as accelerators of rubber vulcanization. The accelerating properties of these substances were discovered and their use in rubber vulcanization was patented fifteen years ago by the Farbenfabriken vorm. F. Bayer of Leverkusen, Germany. Some of these products have been tied and used on a large scale, and certain are now sold on the market; among them may be mentioned the following:

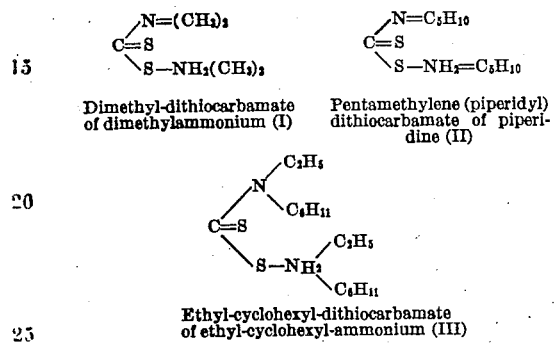

Dimethyl-dithiocarbamate of dimethylammonium (I)

Pentamethylene (piperidyl) dithiocarbamate of piperidine (II)

Ethyl-cyclohexyl-dithiocarbamate of ethyl-cyclohexyl-ammonium (III)

When these accelerators are compounded with mixings of rubber and sulphur, they have a fair action but not a very strong action. Their characteristic accelerator properties are developed to the fullest only when zinc oxide is used in the mixture. With zinc oxide they are very strong accelerators and are capable of completing the vulcanization within a few minutes at the temperatures ordinarily used, 130° C. to 145° C. As the temperature of the vulcanization process becomes lower, a longer period is required, but these accelerators are capable of carrying out the vulcanization at temperatures as low as ordinary room temperature.

In 1919 G. Bruni in the research laboratory of Società Italiana Pirelli, Milan, Italy, recognized and disclosed the ultra accelerating power of the corresponding zinc salts i. e.:

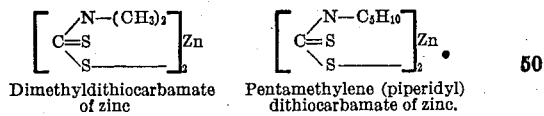

Dimethyldithiocarbamate of zinc

Pentamethylene (piperidyl) dithiocarbamate of zinc.

These ultra-accelerators have not been used to any considerable extent in the vulcanization processes because of their excessively great accelerating abilities. When they are used, vulcanization is started at the temperatures which are used during the preliminary processes in the manufacture of rubber mixings, such as mixing, calendering, and forcing. The occurrence of vulcanization is undesirable during these early stages, and it results in a scorching of the rubber compounds so that they are not available for use in the subsequent operations. If the crude mixings or scraps are allowed to stand, there is a strong likelihood that these ultra-accelerators will cause them to accelerate by themselves at the temperatures used during the early operations. This is in general undesirable since working conditions usually require that the crude mixings be used before vulcanization.

For this reason the search for a nonscorching ultra-accelerator had a considerable importance.

After long experiments in research laboratories we have succeeded in obtaining ultra-accelerators having the properties wanted.

They are new chemical products not yet described in the chemical literature, i. e. dithiocarbamates of quaternary ammoniums of a type entirely new, which are obtained by reaction of aliphatic aldehydes, including formaldehyde upon dithiocarbamates of the secondary bases above mentioned.

For instance by reaction of dimethyl-dithiocarbamate of dimethyl-ammonium upon formaldehyde we obtain:

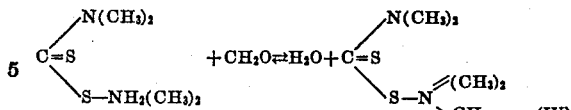

or dimethyldithiocarbamate of methylene-dimethyl-ammonium a white crystalline powder melting at 39°–40° C.

In the same way from piperdyl-dithiocarbamate of piperidine and from ethylcyclohexyl dithiocarbamate of ethyl-cyclohexyl ammonium we obtain respectively:

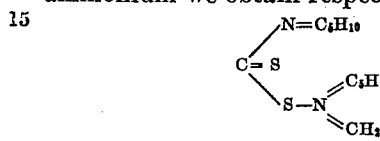

Piperidyl-dithiocarbamate of methylene-piperidyl-ammonium white crystalline powder, m. p. 61° C. (V)

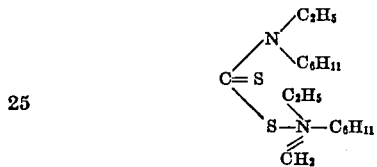

Ethylcyclohexyldithiocarbamate of methylene-ethyl-cyclohexyl ammonium white crystalline powder (VI)

In the same way corresponding products with acetic aldehyde or with other aliphatic aldehydes can be obtained.

They are all ultra accelerators practically with a power like the dithiocarbamates of secondary bases from which they are derived, but presenting much less tendency to scorching.

The two derivatives described under (IV) and (V) tested in comparison with the corresponding starting products (I) and (II) have substantially an equal accelerating power.

For instance with a rubber mixing of 100 parts rubber, 3 parts sulphur, 0.25 parts accelerator, 5 parts zinc oxide a complete vulcanization is obtained in about 10 minutes at 143° C. and after 15 minutes a retrocession begins to take place.

It is to be understood that the above is only by way of example and that the proportion may be varied as required, according to the speed wanted in curing and to the temperature at which it is required to vulcanize and according to the physical-mechanical properties which it is desired to attain in the vulcanized article.

The new accelerators here disclosed while acting identically to the dithiocarbamates known and used till now, as regards vulcanization, behave in a different and much better way in regard to scorching.

This tendency to scorching may be determined by the apparatus and through the procedure conceived in our physical laboratory and disclosed in the "Giornale di Chimica Industriale de Applicata", July 1923, that is taking into account the decreasing in plasticity of the rubber compound when extruded from the nozzle of a small extruding machine kept into a bath at a constant temperature.

From these measurements it may be observed that while the products (I) and (II) give already a very marked scorching at 60° C., with derivatives (IV) and (V), the scorching is practically nil till 70° C. At 80° C. the first two bring the plasticity of the compound down to its half-value in 11 to 16 minutes while the two latter reach this condition only after from 54 to 58 minutes.

At 100° C. that is at a temperature which may be considered as very high from this point of view, the former two compounds reduce to half-value their plasticity in from 4 to 6 minutes and the latter two in from 22 to 25 minutes.

The new derivatives described above behave regarding the ageing much better than the products from which they are derived and may act like true anti-agers.

It is to be understood that the above refers to the vulcanization of mixings of pure rubber and sulphur as well of mixings containing zinc oxide and eventually the other usual compounding ingredients and fillers such as reclaim, ground waste rubber, softeners, anti-agers and/or the other various mineral and organic ingredients commonly used in the rubber industry, and that the expression "vulcanization of rubber" in the following claims is to be understood with this meaning.

Summing up the discovered accelerators above quoted are: Bisubstituted dithiocarbamates of quaternary ammoniums of the general formula:

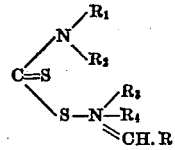

wherein $R_1$ and $R_2$ are monovalent radicals equal or different from one another one of which, at least, is an alkylic radical, such as methyl $CH_3$, ethyl $C_2H_5$, propyl and other alkyl radicals, or an alkylarylic such as benzyl $C_6H_5 \cdot CH_2$; $R_1$ and $R_2$ may be also replaced by a polimethylenic chain such as Pentamethylene—$CH_2$—$CH_2$—$CH_2$—$CH_2$—$CH_2$—(piperidyl); one of the two may be an arylic radical such as phenyl $C_6H_5$, tolyl $CH_3 \cdot C_6H_4$—and similar radicals or an alicyclic radical such as cyclohexyl $C_6H_{11}$—

$R_3$ and $R_4$ are two radicals equal or different one from the other like the preceding and are generally equal respectively to $R_1$ and $R_2$ but may also be different from them.

R may represent hydrogen or an alkylic radical, that is=CH·R is the residue of an aliphatic aldehyde, formic aldehyde included.

What we claim is:

1. The process of vulcanizing rubber which comprises heating a mixture of rubber and sulphur in the presence of an accelerator comprising a compound of the following general formula:

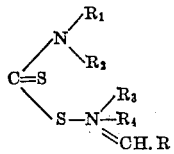

$R_1$, $R_2$, $R_3$ and $R_4$ representing hydrogen or organic radicals, which may be the same radicals or may differ from each other, and CH.R is the residue of an aliphatic aldehyde including formaldehyde.

2. A process as specified in claim 1 in which the radicals $R_1$, $R_2$, $R_3$ and $R_4$ are chosen from the group including alkyl radicals, aralkyl radicals, aryl radicals, alicyclic radicals, polymethylenic radicals, and hydrogen.

3. A process for preparing accelerators for use in the vulcanization of rubber, which consists of reacting bisubstituted dithiocarbamates of quaternary bases with aliphatic aldehydes.

4. As acceleration agents for use in rubber vulcanization, compounds of the following general formula:

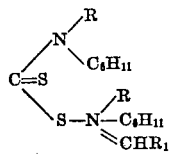

where R is an aliphatic radical and $CHR_1$ is the residue of an aliphatic aldehyde, formaldehyde included.

5. The rubber accelerators specified in claim 4 in which R is the radical $C_2H_5$.

6. A process for vulcanizing rubber and mixtures including rubber, which comprises employing as an accelerator the following compound:

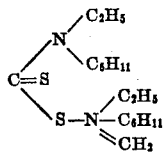

In testimony whereof we affix our signatures.

GIUSEPPE BRUNI.
TULLIO GUIDO LEVI.